UNITED STATES PATENT OFFICE.

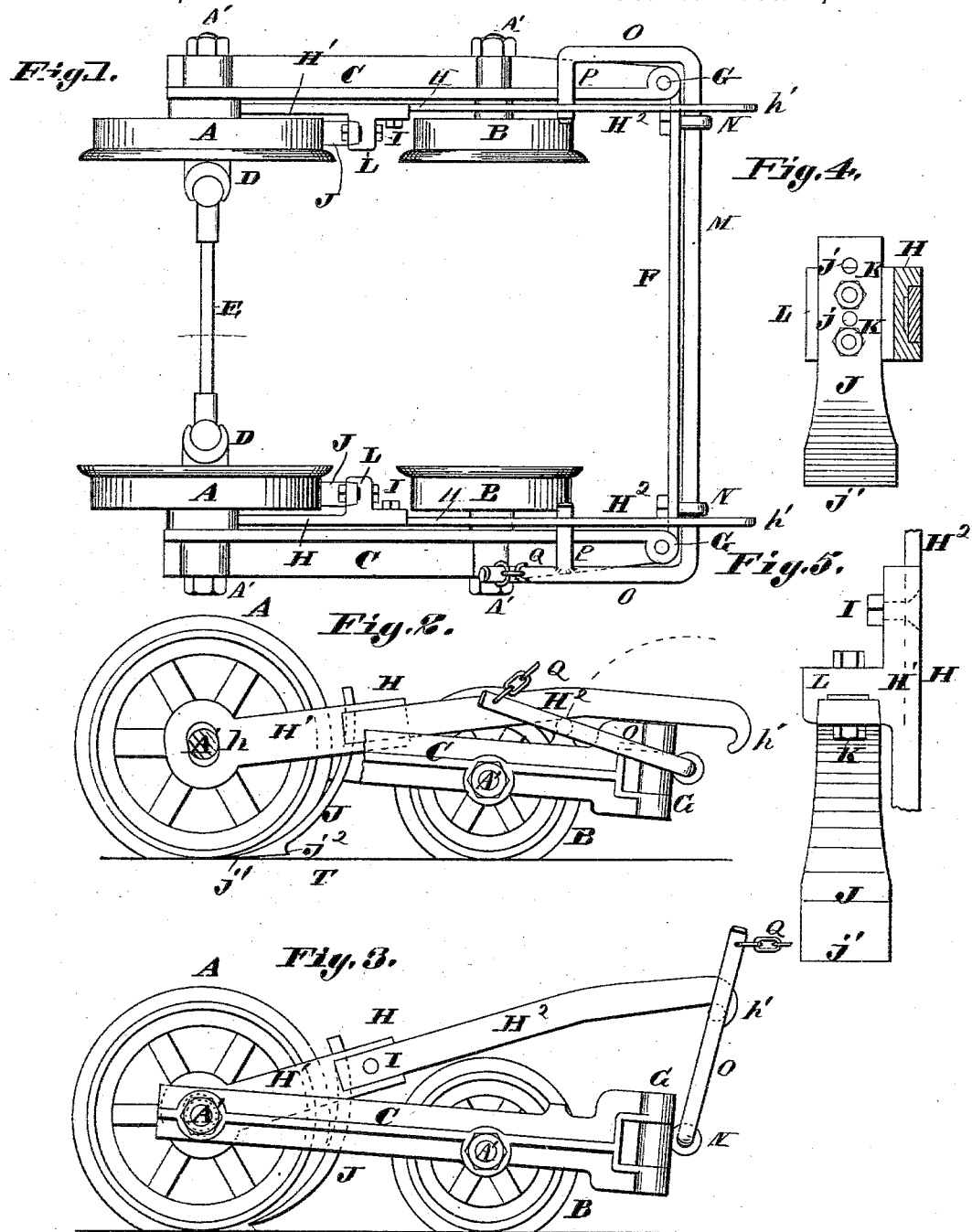

BENHARD YOCH, OF ST. LOUIS, MISSOURI.

MINING-MACHINE.

SPECIFICATION forming part of Letters Patent No. 286,364, dated October 9, 1883.

Application filed July 23, 1883. (No model.)

*To all whom it may concern:*

Be it known that I, BENHARD YOCH, of the city of St. Louis, in the State of Missouri, have invented a new and useful Improvement in Mining-Machines, of which the following is a full, clear, and exact description, reference being had to the accompanying drawings, forming part of this specification.

This improvement relates to the truck of a mining-machine, and to a brake in connection therewith, by which the machine is kept up to its work.

The claims are referred to for statement of invention.

Figure 1 is a top view of the truck. Fig. 2 is a side view with the brakes applied. Fig. 3 is a side view with the brakes raised. Fig. 4 is a front view of the brake. Fig. 5 is a top view of same.

The truck is supported on fore wheels, A, and rear wheels, B, all of them turning on arbors A', fixed to the side rails, C, of the truck. Upon the inner ends of the arbors of the fore wheels are joints D, connecting them with a transverse tie-bar, E. The rear ends of the side bars are connected by a bar, F, which is jointed to said side bars at G. The construction is such that either of the side bars may be moved in advance of the other to swing the mining cylinder-frame in a horizontal plane. No novelty is herein broadly claimed for a jointed truck allowing said movement.

H are brake-levers loosely fulcrumed to the arbors A' of the fore wheels, the fulcrum-socket $h$ being elongated transversely to the lever to allow the brake to accommodate itself to the wheel A and track T, or to fall clear of the wheel when raised up. (See Fig. 3.) I prefer to make the lever H of a cast-iron end, H', and a wrought-iron bar, $H^2$; but this manner of construction is in no way essential, for it may be made of any suitable material. As shown, the end of the bar $H^2$ fits a recess in the part H', and is held by a screw-bolt, I.

The brake consists of a bar, J, attached to a side lug, L, of the lever H by bolts K. The brake-bar is bored with additional bolt-holes $j$, or is slotted to allow its adjustment on the lug. The point $j'$ of the brake is fitted to occupy the angle between the tread of the wheel and the rail, so that when it is applied (see Fig. 2) the truck cannot make any retrograde movement.

The brake may have a heel, $j^2$, to give it a longer bearing on the rail, as shown in Fig. 2, or may be without this projection, as shown in Fig. 3.

To lift the free ends of both brake-levers simultaneously, I use a frame, M, hinged to the bar F at N N, and having arms O, with fingers P, extending beneath the levers H. The construction is such that when the frame is thrown upward and backward on its hinges the levers are raised and the brake drawn from the wheel. As the free ends of the levers are lifted the other end drops upon its fulcrum and the brake falls back from the wheel A. When the frame M is drawn backward, the fingers engage against downturned hooks $h'$, which arrest the backward movement of the frame when it is somewhat past the vertical, so that its weight tends to hold it in such position.

As means to lift the frame M, I show one of the arms O extended above the finger P, and a chain, Q, attached to the arm, which is in easy reach of the operator.

It will be seen that owing to the disconnection of the levers H and lifting-frame M these parts will not interfere with the movement of the truck-joints, and that the frame will act with freedom upon the levers at all times.

I claim as my invention—

1. In a truck, the combination of track-wheels A and a lever, H, fulcrumed to the truck at its end, having descending curved brake-bar J between its ends, the weight of the lever to hold the brake-bar in locking position, as set forth.

2. The combination of lever H, having elongated fulcrum-socket, $h$, and brake J, rigidly attached to said lever, substantially as set forth.

3. The combination of the levers H, carrying brakes, and the rock-frame M, acting upon the levers, substantially as set forth.

4. The combination, with the brake-levers

H, of rock-frame M, acting on the levers and falling past a vertical position as raised, and the stops $h'$ upon the levers, substantially as and for the purpose set forth.

5. The combination, with a jointed truck, of the brake-levers H and lifting-frame M, actuating the levers but disconnected therefrom, substantially as and for the purpose set forth.

BENHARD YOCH.

Witnesses:
SAML. KNIGHT,
EDW. E. ISRAEL.